(12) United States Patent
Nelson et al.

(10) Patent No.: US 6,466,974 B1
(45) Date of Patent: Oct. 15, 2002

(54) ENVIRONMENT FOR CREATING AND MANAGING NETWORK MANAGEMENT SOFTWARE OBJECTS

(75) Inventors: Jamie Nelson, Ridgefield, CT (US); Jonathan Nelson, San Ramon, CA (US); David Spencer, San Francisco; Rajeev Angal, Santa Clara, both of CA (US)

(73) Assignee: Sun Microsystems, Inc.

( * ) Notice: Subject to any disclaimer, the term of this patent is extended or adjusted under 35 U.S.C. 154(b) by 0 days.

(21) Appl. No.: 09/205,325

(22) Filed: Dec. 4, 1998

(51) Int. Cl.[7] ............................................... G09F 15/16
(52) U.S. Cl. ........................ 709/223; 709/317; 709/230
(58) Field of Search .................................. 709/310–320, 709/328–332, 200–253; 717/1–9, 11, 100–119; 370/466; 714/38; 707/102

(56) References Cited

U.S. PATENT DOCUMENTS

| | | | | |
|---|---|---|---|---|
| 5,850,511 A | * | 12/1998 | Stoecker et al. | 714/38 |
| 6,061,721 A | * | 5/2000 | Ismael et al. | 709/223 |
| 6,128,315 A | * | 10/2000 | Takeuchi | 370/466 |
| 6,182,153 B1 | * | 1/2001 | Hollberg et al. | 709/315 |
| 6,226,666 B1 | * | 5/2001 | Chang et al. | 709/202 |
| 6,226,679 B1 | * | 5/2001 | Gupta | 709/230 |
| 6,233,582 B1 | * | 5/2001 | Traversat et al. | 707/102 |
| 6,233,601 B1 | * | 5/2001 | Walsh | 709/202 |
| 6,272,537 B1 | * | 8/2001 | Kekic et al. | 709/223 |
| 6,272,677 B1 | * | 8/2001 | Lam et al. | 717/11 |
| 6,351,771 B1 | * | 2/2002 | Craddock et al. | 709/227 |
| 6,356,931 B2 | * | 3/2002 | Ismael et al. | 709/202 |

OTHER PUBLICATIONS

Clip, Paul, "Java'a Object–Oriented Communications", BYTE, Feb. 1998, pp(3).*

Schneider et al., "Management of Virtual Private Networks for Integrated Broadband Communication," ACM, pp. 224–237, 1993.*

* cited by examiner

Primary Examiner—St. John Courtenay, III
(74) Attorney, Agent, or Firm—Beyer Weaver & Thomas, LLP

(57) ABSTRACT

A method for creating and managing a computer network management agent that includes a Java development management kit ("JDMK")-created object is provided. In one embodiment, the method a JDMK agent object configured to provide computer network management functions is created. Address, type, and object class information are provided for the JDMK agent object. The JDMK agent object is installed on the computer network. In another embodiment, the method of the invention includes communicating with the JDMK agent object over the computer network.

20 Claims, 14 Drawing Sheets

ENVIRONMENT FOR CREATING AND MANAGING NETWORK MANAGEMENT SOFTWARE OBJECTS

TABLE OF CONTENTS
1. BACKGROUND OF THE INVENTION . . .
   1.1 FIELD OF THE INVENTION . . .
   1.2 THE RELATED ART . . .
2. SUMMARY OF THE INVENTION . . .
3. BRIEF DESCRIPTION OF THE DRAWINGS . . .
4. DESCRIPTION OF SOME EMBODIMENTS OF THE INVENTION . . .
5. CONCLUSION . . .

1 BACKGROUND OF THE INVENTION

1.1 Field of the Invention

The present invention relates to computer network architectures and, more specifically, to software for managing computer and communications networks. More particularly, the present invention provides software, systems, and apparatus for managing software entities and hardware over a computer network. The present invention has applications in the areas of computer science, computer network management, and computer software.

1.2 The Related Art

The demands on computer network managers have grown exponentially as the size and extensiveness of computer networks has grown over the past decade. Starting from the relatively simple task of maintaining communication among a relatively small number of mainframe computers, network managers must now coordinate operations among thousands of computers, printers, servers, and other networked devices. With the advent of the Java® and Jini™ programming languages, even household devices will soon become linked over computer networks running on household "intranets" that in turn are linked to the worldwide Internet. Thus, there appears to be no end in sight to the increasing burden on network managers.

To control and coordinate the software associated with the myriad of networked computers and other devices, network managers employ software designed to track, establish communications with, and control various software entities or processes that exist independently or represent the networked devices. Entities that represent networked devices are also referred to herein as "agents". The software used by the network manager interacts with various "platform-level" software services to enable the network manager to locate and interact with the various entities running on the network. Various services are provided to identify the entities, retrieve needed data about the properties and states of the entities, and store that information for use by other entities and user applications. In particular, a topology service is used to store information about the entities and devices and their relationships.

Generally, production of software for network use is cumbersome and expensive. For example, to create the various software applications, agents, and other entities resident on the network, programmers have to be fluent in languages and APIs such as PMI, C++, GDMO, and ASN1. The new software then has to be debugged prior to installation, and, once installed, creates a new level of complexity for the network manager. Production of such software is expensive, as relatively few programmers have the requisite familiarity with the diverse and arcane languages required to write network software. Once written, additional expenses are incurred in the cycle of debugging and upgrading.

The Java programming language has emerged as a tool for producing software efficiently. In particular, the combination of Java programming code and the Java Virtual Machine ("JVM") allows the creation of platform-independent software that can be installed dynamically and/or remotely. Thus, the use of Java-coded network software applications, agents, and other entities can alleviate the above-described expenses and difficulties associated with producing network management software using traditional languages and methods. In addition, the Java programming language is richer than the languages used currently to provide network management software. Thus, Java-based software management software application, agents, and entities having more functionality can be developed.

However, the provision of several programming tools would facilitate writing Java network management software and install those applications on systems using GDMO/CMIS objects. These tools include tools capable of translating JavaBean classes into their corresponding GDMO objects, a device to map GDMO CMIS requests into Java-Bean Java Dynamic Management Kit ("JDMK"), and a mechanism to translate JDMK JavaBean events to CMIS notifications. Therefore, it would be beneficial to provide such tools for producing Java-based computer network management software. The present invention meets these and other needs.

2 SUMMARY OF THE INVENTION

The present invention meets the above-described needs by providing, in one aspect, programming tools that facilitate writing and incorporating Java network management software for computer and communications network management architectures. The software, systems, and methods provided by the present invention will thus allow computer network programmers and managers easier access to the benefits provided by the Java programming language. These benefits include faster development time, greater access to programmer talent, and easier implementation.

In a fist aspect, the present invention provides a method for creating and managing a computer network management agent that includes a Java development management kit ("JDMK")-created object. In one embodiment, the method provided by the present invention a JDMK agent object configured to provide computer network management functions is created. Address, type, and object class information are provided for the JDMK agent object. The JDMK agent object is installed on the computer network. In another embodiment, the method of the invention includes communicating with the JDMK agent object over the computer network. In a more specific embodiment, the step of providing address, type, and object class information includes the substeps of (1) providing a distinguished name for the JDMK agent object, (2) providing attributes for the JDMK agent object, (3) forming a connection with the JDMK agent object, and (4) forming a JDMK agent object name for said JDMK agent object.

In another aspect, the present invention provides a method for managing a JDMK agent object. In one embodiment, a method for managing a JDMK agent object includes providing a distinguished name for said JDMK agent object. Attributes are provided for the JDMK agent object, and a connection is formed with the JDMK agent object. The supported classes for the JDMK agent object are determined, and the JDMK agent object is retrieved according to the determined classes. The JDMK agent object is then translated into a network communication protocol or language, such as GDMO. In addition, a variety of operations can be performed on the JDMK agent object including, but not limited to, getter, setter, deletion, and action operations.

In still another aspect, the management of the JDMK agent object is performed in conjunction with a daemon that listens for notifications indicating a change has been made to the JDMK agent object. In one embodiment, a method for managing a JDMK agent object includes creating a GDMO name for an event signaling that said JDMK agent has been changed. A notification of the event is then created. If the event signals an agent object creation/deletion event, then the event is forwarded. If the event does not signal an agent object creation/deletion event, then the perceived event severity is determined. In a more specific embodiment, get operations for getters included with the agent object are performed and all text methods are concatenated.

In yet another aspect, the present invention includes a daemon configured to monitor for, and report the occurrence of, events regarding a JDMK agent object. According to one embodiment, a daemon provided by the present invention includes a first translation mechanism configured to translate messages from a JDMK agent object from JDMK-encoding into Java encoding. The first translation mechanism is coupled with a second translation mechanism configured to translate messages encoded in Java into a computer network communication protocol. In a more specific embodiment, the first translation mechanism is coupled with a JDMK agent object. In a still more specific embodiment, the first translation mechanism is coupled with a JDMK agent object and t he second translation mechanism is coupled with a management information server.

In another aspect, the present invention provides computer-readable media and data signals configured to cause a computer to create a JDMK agent object configured to provide computer network management functions. The media and data signals are also configured to cause a computer to provide address, type, and object class information for the JDMK agent and install the agent on the computer network.

In a more specific embodiment, the network communications protocol or language is GDMO. In another embodiment, each Java-defined object class of the computer network management software onto a corresponding GDMO class. Each getter, setter, and isxxx statement of the computer network management software into a corresponding GDMO statement. Event-specific class and perform method of the computer network management software is mapped into a corresponding GDMO statement.

In another aspect, the present invention provides computer-readable media and data signals that are configured to cause a computer to perform the computer-implemented steps of translating Java-defined objects and methods into a computer network communications protocol or language. The computer-readable media and signals further include code devices configured to cause a computer to create a document including these translated objects and methods and install the document in a management information server. The computer-readable media and signals further include code devices configured to cause a computer to configure and locate an object in the management information server to represent the computer network management software. This object is used to communicate with the computer network management software.

These and other aspects and advantages will become apparent when the Description below is read in conjunction with the accompanying Drawings.

3 BRIEF DESCRIPTION OF THE DRAWINGS

4 DESCRIPTION OF SOME EMBODIMENTS OF THE INVENTION

The present invention provides software, methods, and systems for producing network management software, agents, and entities using the Java programming language. More particularly, the present invention provides tools capable of translating JavaBean classes into their corresponding GDMO objects, devices to map GDMO CMIS requests into JavaBean Java Dynamic Management Kit ("JDMK"), and mechanisms to translate JDMK JavaBean events to CMIS notifications. These tools, devices and mechanisms enable the production an installation of Java-based network management software.

Figure 1:
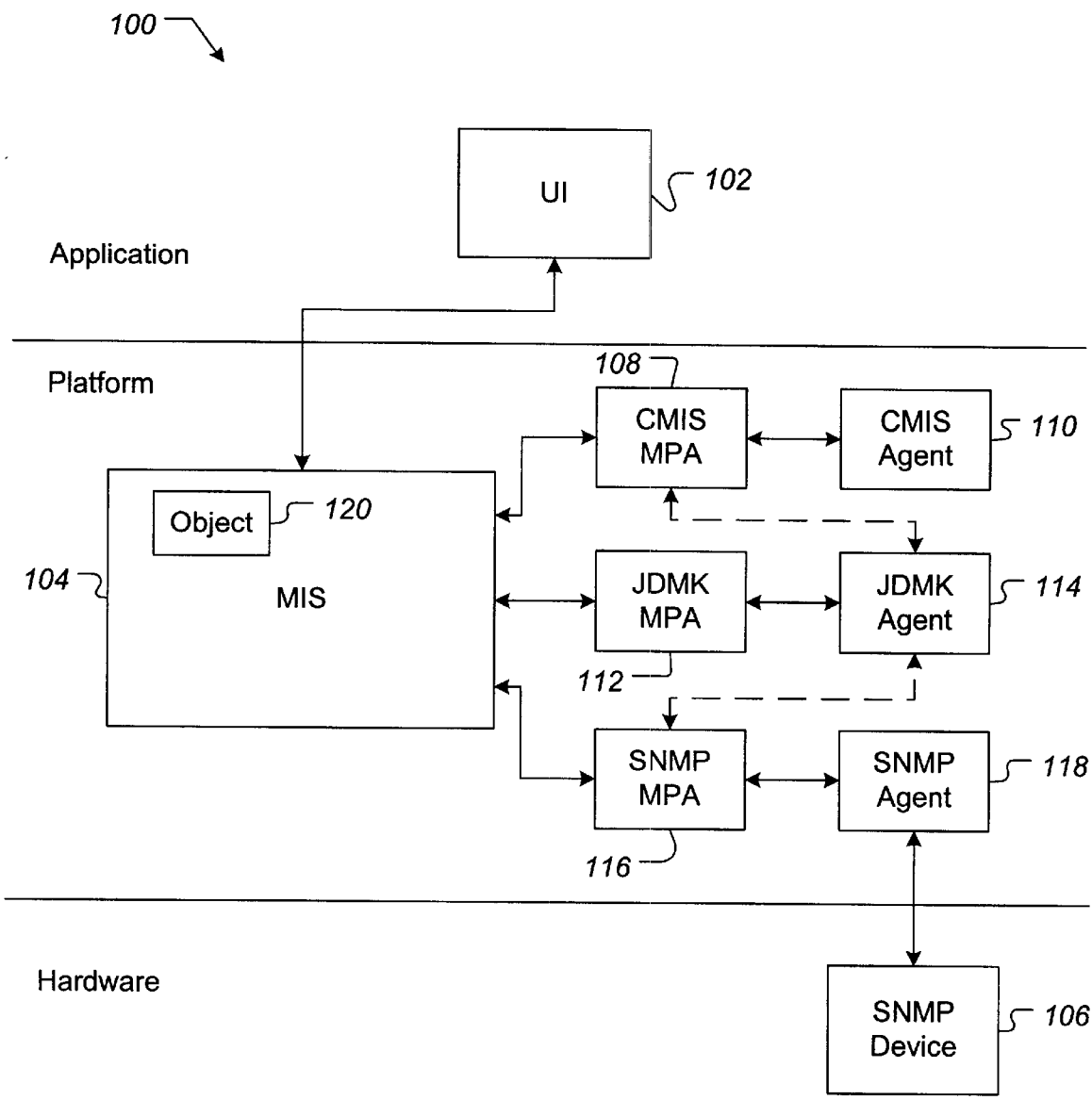
FIG. 1 is a schematic view of software and hardware elements comprising an embodiment of a computer network in accordance with the present invention.

FIG. 1 at 100 illustrates various software and hardware components used to manage computer network operations in accordance with one embodiment of the present invention. Generally, computer network software and hardware operations can be organized conceptually into three layers: an Application layer, a Platform layer, and a Hardware layer. The Application layer generally comprises user interface ("UI") software 102 designed to allow network operators to communicate with software and hardware installed on the network. Such communications include, but are not limited to, sending requests, receiving alarms, receiving status reports, locating devices, and controlling devices. A Hardware layer represent the various devices installed on the network, such as SNMP device 106. Examples of devices include communications devices, routers, severs, modems, computers, printers, network interface cards, and hubs. These devices can use any of the various communications languages and protocols to communicate with UI 102 such as, but not limited to, GDMO, ASN1, SNMP, or CMIS. Still more examples of applications, devices, and protocols will be apparent to those having skill in the computer science and computer network arts. In particular, the software, systems, and methods described herein can be applied to communications networks by analogy to the presentation provided for communications networks embodiments of the present invention. Such adaptation can be made by those of skill in the computer science, network, and communications arts where needed.

Between the Application layer and the Hardware layer is the Platform layer. This layer comprises network management software designed to allow the network administrator operating an application such as UI 102 access to entities and devices on the network. The network management software also operates to enable communications among various entities installed on the network, it including event communications. In one embodiment, the network communications are handled by a central Management Information Server ("MIS") 104 that coordinates messages sent between entities running on each of the network layers, and, in particular, UI 102 and Device 106. MIS 104 interacts with various services for network management in addition to other services, including Message Protocol Adapters ("MPAs") 108, 112, and 116. Each MPA is configured to handle communications in a particular protocol (e.g. CMIS, JDMK, or SNMP) and each is coupled with a corresponding Agent that is coupled with one or more devices. Thus, SNMP Device 106 communicates with MIS 104 via SNMP Agent 114 and SNMP MPA 116. Each Agent has a corresponding Object stored in the MIS, such as Object 120, to enable management of the Agent using the MIS. It will be appreciated by those having skill in the computer science and network arts that different communications architectures can be used without departing from the invention.

Figure 2:
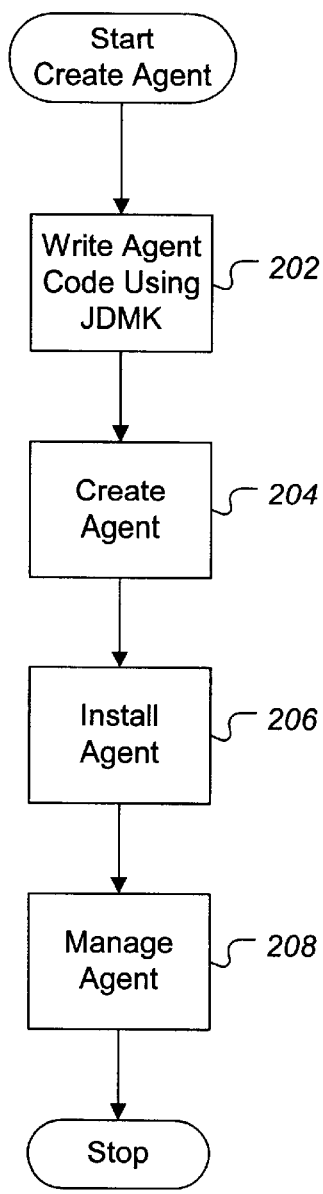
FIG. 2 is a flowchart illustrating one embodiment for creating a software agent in accordance with the present invention.

FIG. 2 illustrates one embodiment of a method for creating and using computer network software agents in accordance with the present invention. Starting at 202, the code defining the agent is written using JDMK, which is known to those having skill in the computer science and network arts. The agent is created at step 204, and installed on the computer network at step 206. Again, these steps can be performed using known methods and materials such as JDMK. The agent is then managed at step 208 as described in greater detail hereinbelow.

Figure 3:
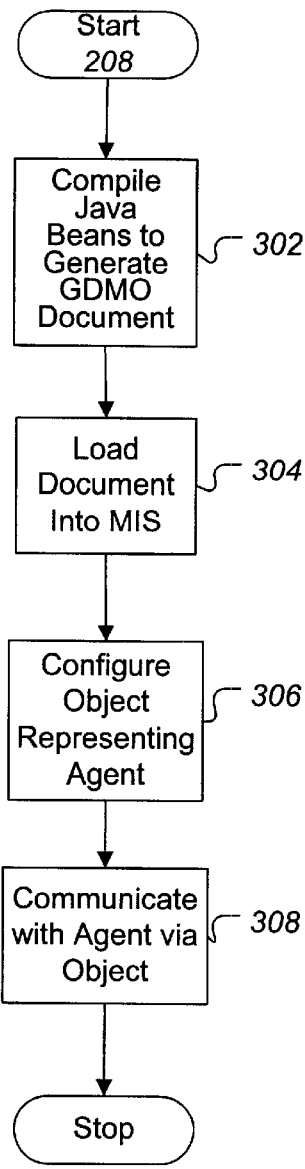
FIG. 3 is a flowchart illustrating one embodiment for performing step 208 of FIG. 2 in greater detail.

One embodiment of performing step 208 of FIG. 2 is shown in FIG. 3. Starting at step 302, the objects that comprise the Agent code written at step 202 of FIG. 2 are converted into a GDMO Document. Typically, these objects comprise JavaBeans objects. A Java-GDMO compiler is used to create the GDMO Document an embodiment of which compiler is described hereinbelow. In addition a corresponding file containing ASN1 object type references is created in a separate step. In one embodiment, the creation of the ASN1 file occurs when the network management software is initialized. Other sequences can be utilized as well. The GDMO Document is loaded into the MIS at step 304. The object representing the Agent is configured at As step 306, and communication with the Agent is performed using the object and MIS at step 308.

Figure 4:
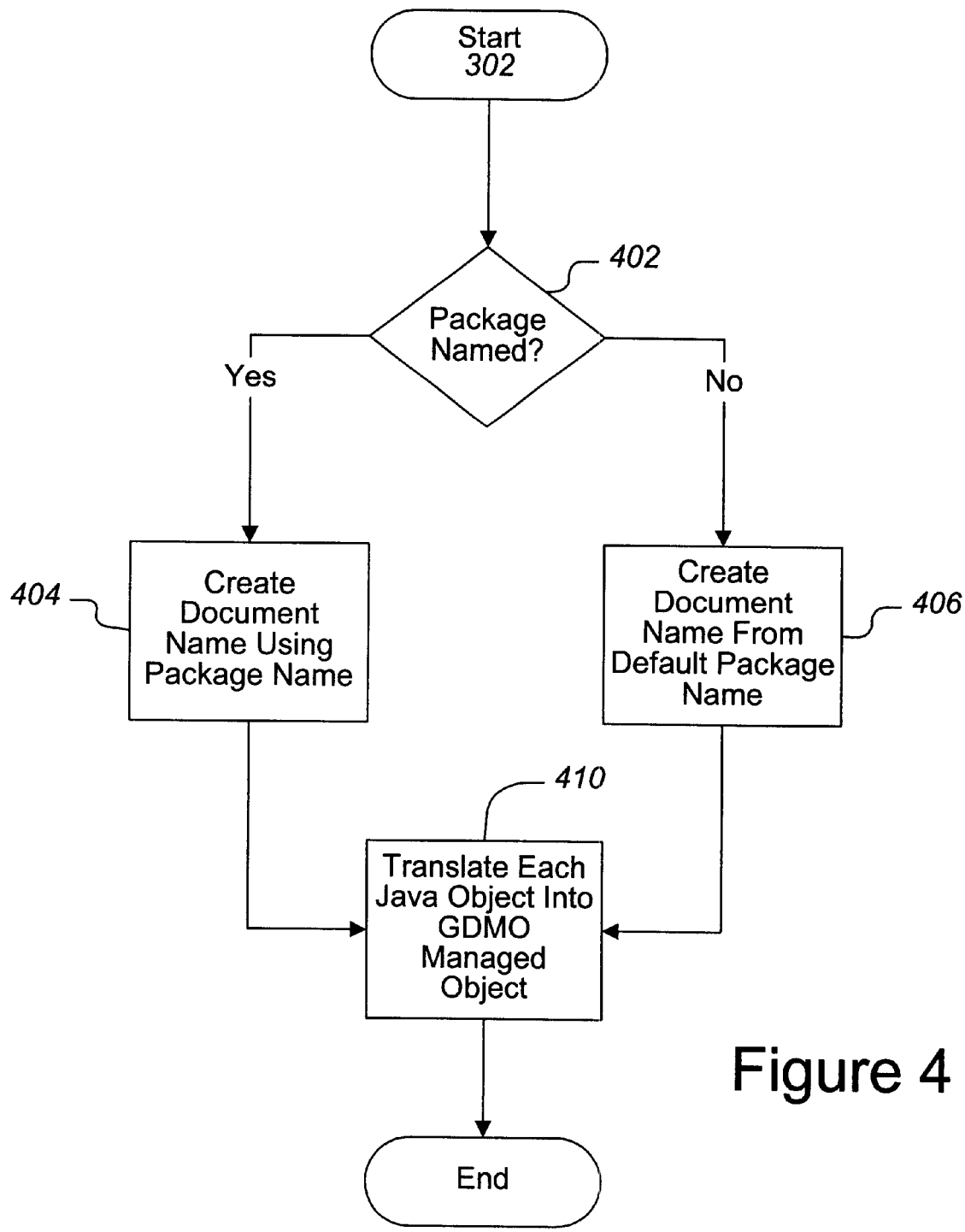
FIG. 4 is a flowchart illustrating one embodiment for performing step 302 of FIG. 3 is greater detail.

One embodiment of performing step 302 of FIG. 3 is illustrated in FIG. 4. At step 402 a determination is made whether the JDMK agent includes a Package Name. If a Package Name exists, then, following the "Yes" branch to step 404, the GDMO Document is named using the Package Name. Otherwise, the "No" branch is followed to step 408, where a Document Name is created using a default Package Name. Following either step 404 or 406, the process flow moves to step 408 where each JavaBean Class is translated into a GDMO-managed object class.

Figure 5:
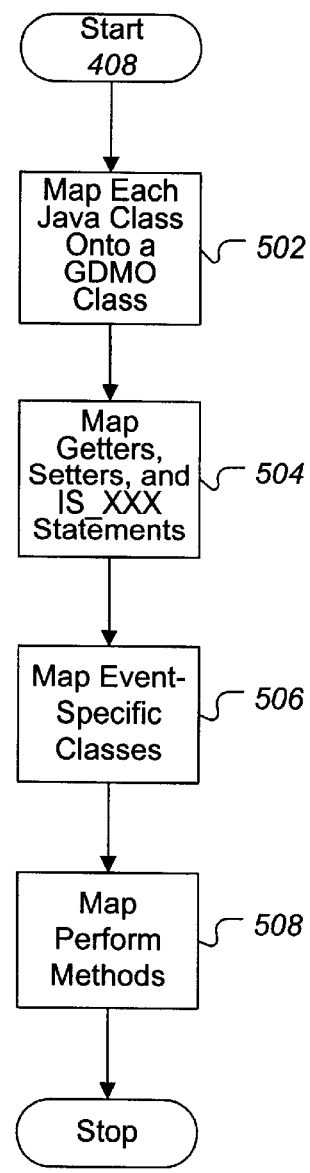
FIG. 5 is a flowchart illustrating one embodiment for performing step 408 of FIG. 4 in greater detail.

An embodiment for performing this last step is illustrated in greater detail in FIG. 5. At step 502, each Java class defined for the Agent is mapped to a corresponding GDMO class. In one embodiment, the GDMO class name is derived by taking the class names of the Java classes and changing any instances where the first letter of the Java class name is an upper-case letter to the corresponding lower-case letter. In addition, the conversion includes mapping the Java classes, that conform to the Bean Specification as known to those of skill in the compute science arts, to GDMO-managed object class that include object classes having attributes (as will also be familiar to those of skill in the computer science arts). According to one embodiment, any Java super classes or private classes are ignored in the mapping. At step 504, all "getter", "setter", and "isxxx" statements (where "xxx" is a Boolean value being tested) are translated to corresponding GDMO statements.

More particularly, in one embodiment, step 504 includes analyzing the getters to determine attribute values. For example, if the getter is coupled with a setter, then the corresponding GDMO attribute is "read/write". If the getter is not paired with a setter, then the corresponding GDMO attribute is "read only" If an unpaired setter is found, then the statement is ignored. At step 506 all event-specific statements are mapped to their corresponding GDMO notification statements. Finally, at step 508 all "performxxx" methods are translated to an equivalent GDMO action template. The arguments of the "perform" methods are used as input syntax; the arguments of the return methods are used as reply syntax. "Isxxx" statements are mapped to GDMO Boolean-type xxx statements According to one embodiment of the invention, a separate GDMO Document is created for each named package. In another embodiment, a single default-named GDMO Document is created for holding all translated objects from unnamed packages.

Figure 6:
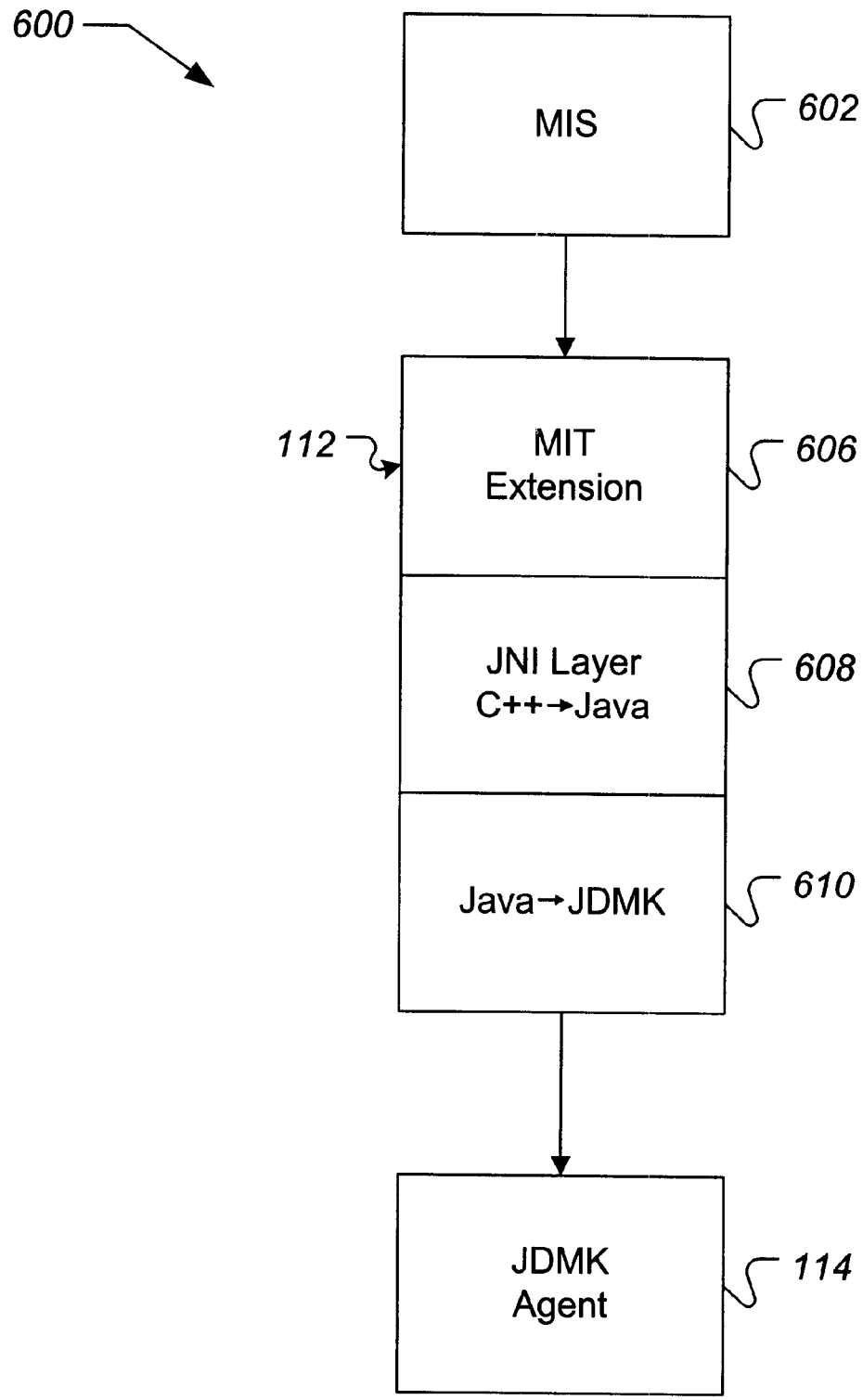
FIG. 6 is an illustration of one embodiment of an Message Protocol Adapter ("MPA") in accordance with the present invention.
Figure 7:
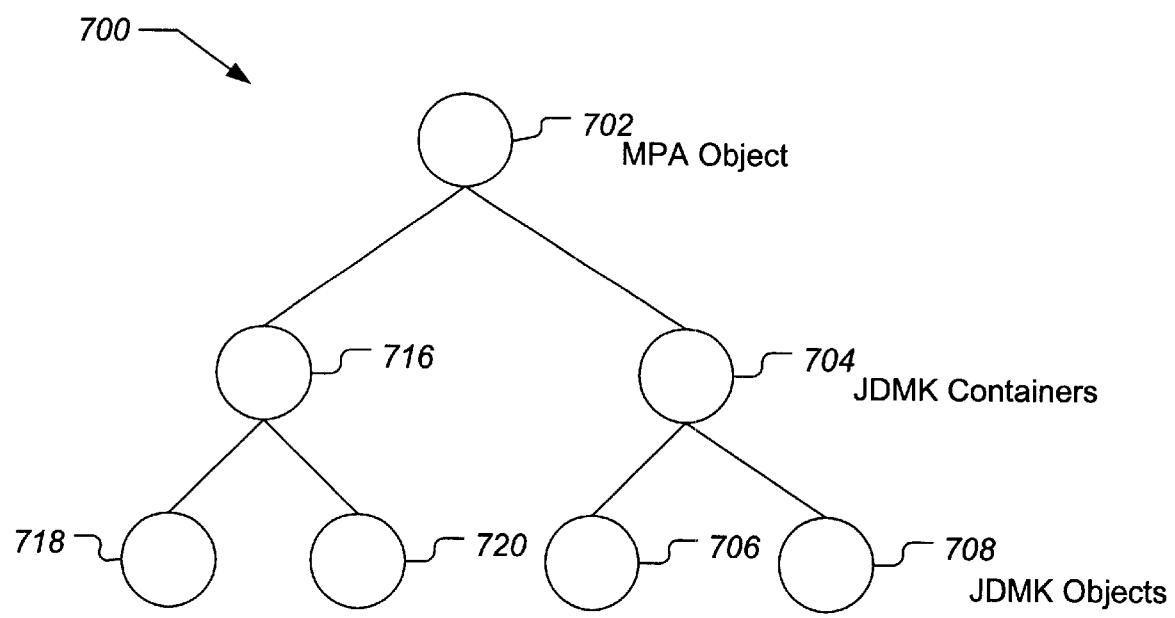
FIG. 7 is an illustration of an object hierarchy in accordance with the present invention.

One embodiment of the JDMK MPA 112 shown in FIG. 1 is provided at 600 in FIG. 6. In the illustrated embodiment, MPA 112 provides communication with agents associated with the MPA in addition to an "object model" that allows JDMK-written objects to work transparently with the network management software. There, JDMK MPA 112 includes a Management Information Tree Extension ("MIT") 602 that interfaces MPA 112 with MIS 104. In one embodiment MIT Extension 602 provides support for traversing a hierarchical object structure such as shown at 700 in FIG. 7. The exemplary file structure includes an MPA Object 702 that is associated with one or more JDMK Container objects 502 . . . 506. Each of the JDMK Containers is associated in turn with one or more JDMK classes 508 . . . 510 and 512 . . . 514. Returning to FIG. 6, a Java Native Interface ("JNI") Layer 604 includes a library of C and/or C++methods configured to define a Java Virtual Machine ("JVM") that provides translation of CMIS to Java. In one embodiment, this layer also includes Solaris threads configured to provide additional support when the MPA is running in conjunction with the Solaris operating system (available commercially from Sun Microsystems of Palo Alto, Calif.). A Java-to-JDMK Layer 606 includes various Java classes configured to provide translation from Java to JDMK. Layer 606 communicates with JDMK Agent 114. As will be appreciated from the foregoing description, communication with either of Layers 604 or 606 can be performed directly by accessing the appropriate Java or JDMK interfaces, respectively.

Figure 8:
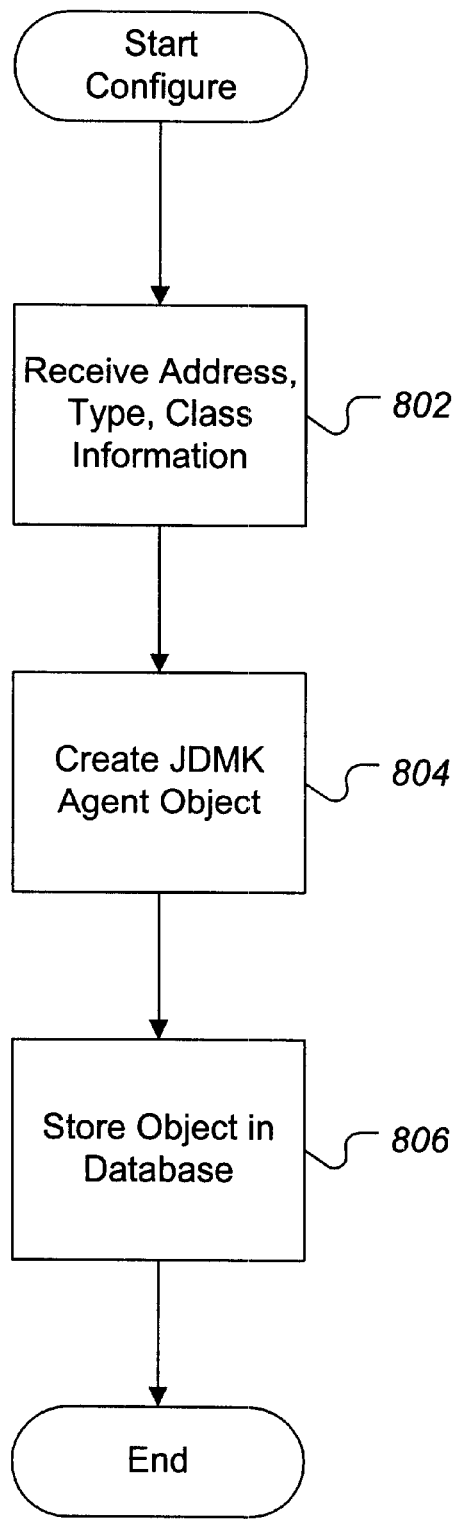
FIG. 8 is a flowchart illustrating one embodiment for configuring a JDMK object in accordance with the present invention.

FIGS. 8–12 illustrate embodiments of methods for performing various JDMK agent and object creation functions and operations on such JDMK agents and objects using the JDMK MPA of the invention. FIG. 8 illustrates one embodiment of a method for creating a JDMK Agent container object, such as Agent 114. Starting at step 802 the IP address of the agent, the port, adapter type (e.g., RMI, CORBA, Hypertext Transfer Protocol ("http")), domain name, and the supported classes are received by MPA 112 from MIS 104. The JDMK Agent object is created using this information at step 804 employing standard methods, and, at step 806, the object is stored in persistent storage for use.

Figure 9:
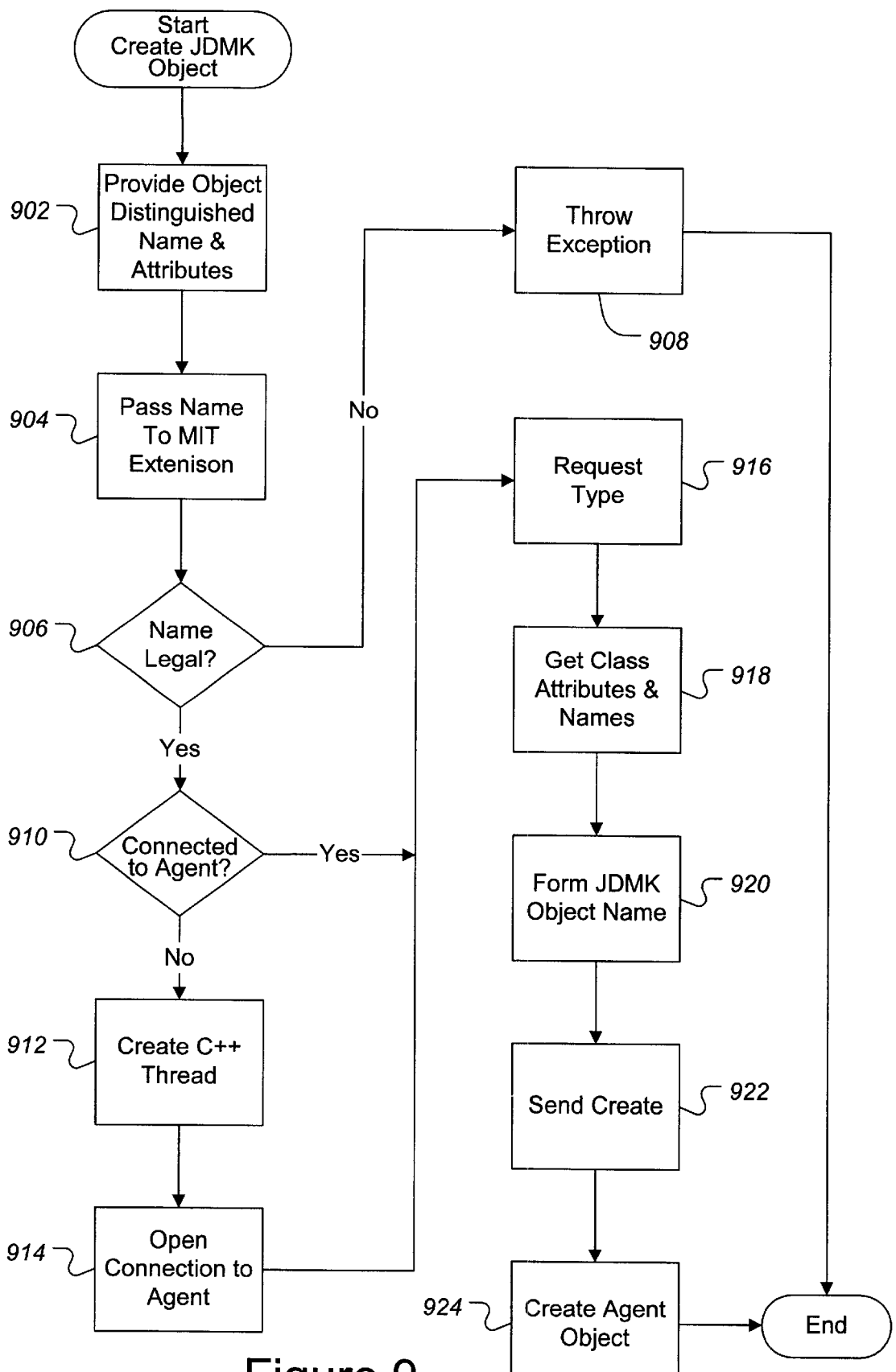
FIG. 9 is a flowchart illustrating one embodiment for processing a request in accordance with the present invention.

FIG. 9 illustrates a method for creating a JDMK Object in accordance with one embodiment of the present invention. Starting at 902 the JDMK MPA is provided with a Distinguished Name for the object and the attributes of the object. The Distinguished Name can be provided, for example, by input from an application such as UI 102. Examples of Distinguished Name syntax can be found in publicly available sources, such as the X0.700-series specifications. The attributes are derived from the translated GDMO Document created at step 302 of FIG. 3. At step 904, the Distinguished name is passed to the MIT Extension of the MPA and, at step 906, a determination is made whether the Distinguished Name is legal. If the name is not legal, then the "No" branch of step 906 is follows in which an exception is thrown at step 908 and the process terminates. Otherwise, the "Yes" branch of step 906 is followed to step 910 where a determination is made whether the MPA is connected to agent. If there is no connection to an agent, then the "No" branch is followed to step 912 where a C++thread is created. At step 914 a connection is opened to the agent. Following step 914 or the "Yes" branch of step 910, the Request Type for the creation is derived from the Distinguished Name at step 916. The Request Type is provided, in one example, by input from an application such as UI 102. At step 918, the class names and attributes for the object are determined, the latter being obtained from a repository of GDMO Documents. At step 920, the JDMK object name is created. One example of a suitable JDMK object name format is provided below:

domain:package.class.attr=val,attr=val . . . .

At step 922, a JDMK Create command is forwarded, and, at step 924, the object is created.

Figure 10:
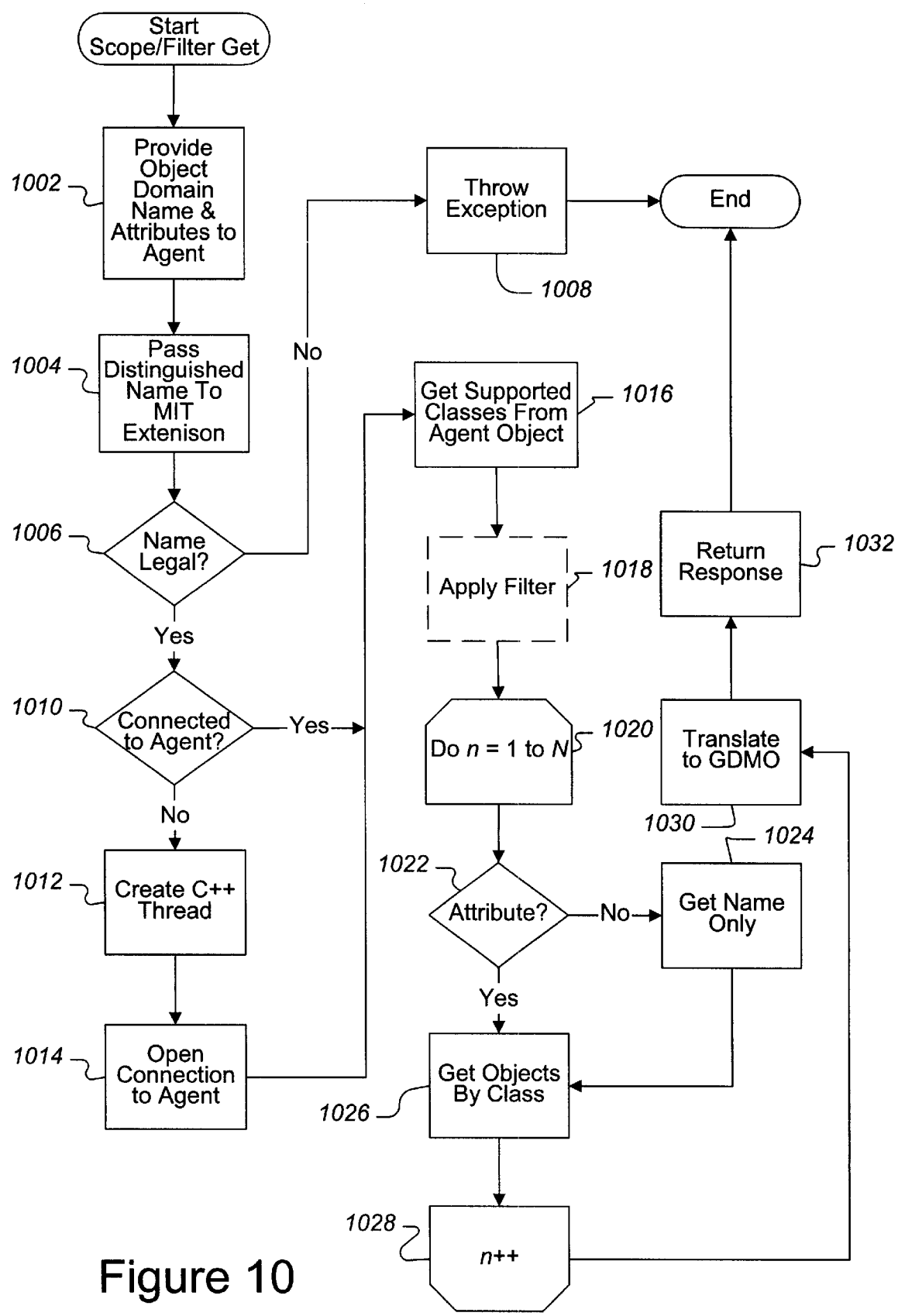
FIG. 10 is a flowchart illustrating one embodiment for processing a "scope/filter get" request in accordance with the present invention.

FIG. 10 illustrates an embodiment of the invention for performing scope get operations that are optionally filtered. Starting at 1002 the JDMK MPA is provided with a Distinguished Name for the object and the attributes of the object. The attributes are derived from the translated GDMO Document created at step 302 of FIG. 3. At step 1004, the Distinguished Name is passed to the MIT Extension of the MPA and, at step 1006, a determination is made whether the Distinguished Name is legal. If the name is not legal, then the "No" branch of step 1006 is follows in which an exception is thrown at step 1008 and the process terminates. Otherwise, the "Yes" branch of step 1006 is followed to step 1010 where a determination is made whether the MPA is connected to agent. If there is no connection to an agent, then the "No" branch is followed to step 1012 where a C++thread is created.

At step 1014 a connection is opened to the agent. Following step 1014, or the "Yes" branch of step 1010, the supported classes are retrieved from the Agent Object at step 1016 at which time the scope is implemented. At step 1018 any filter that has been included for the get request is applied to those classes that meet the scope conditions. After step 1016 and/or step 1018 the retrieved N object classes, are examined serially as illustrated by the loop shown at 1020 and 1028 in which a determination is made as to whether an attribute (or attributes) are defined for the $n^{th}$ object at step 1022. If no attribute(s) are defined for the $n^{th}$ object, then, following the "No" branch of step 1022 to step 1024, the name of the object is retrieved. Following step 1024 or the "Yes" branch of step 1022, the objects are retrieved by class at step 1026. When the loop operation is completed, then the objects are translated to GDMO as described above at step 1030. A response is returned at step 1032.

Figure 11:
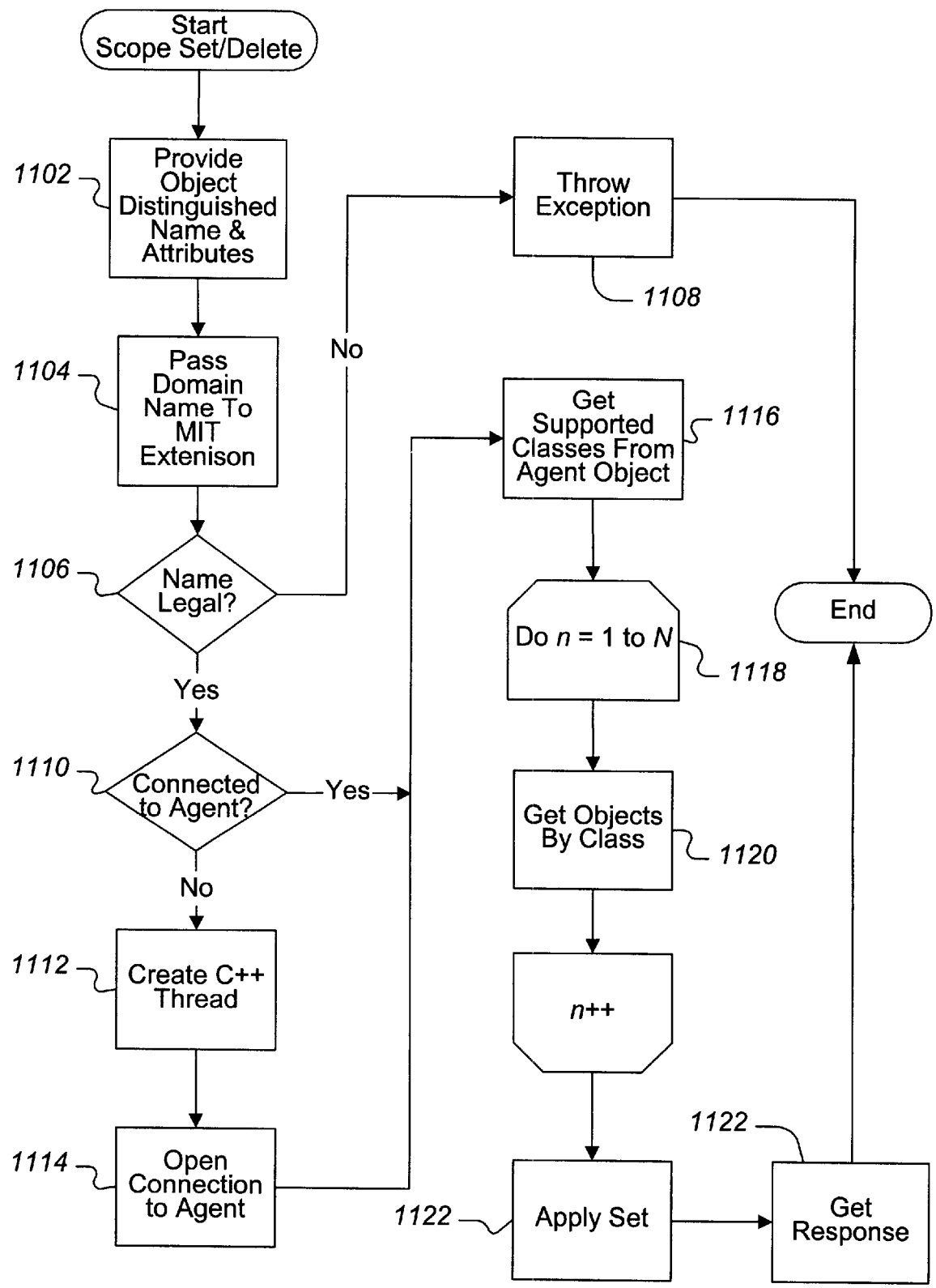
FIG. 11 is a flowchart illustrating one embodiment for processing a "scope set/delete" request in accordance with the present invention.

FIG. 11 illustrates an embodiment for performing scope set/delete operations in accordance with one embodiment of the present invention. FIG. 1 illustrates an embodiment of the invention for performing scope get operations that are optionally filtered. Starting at 1102 the JDMK MPA is provided with a Distinguished Name for the object and the attributes of the object. The attributes are derived from the translated GDMO Document created at step 302 of FIG. 3. At step 1104, the Distinguished name is passed to the MIT Extension of the MPA and, at step 1106, a determination is made whether the Distinguished Name is legal. If the name is not legal, then the "No" branch of step 1106 is follows in which an exception is thrown at step 1108 and the process terminates. Otherwise, the "Yes" branch of step 1106 is followed to step 1111 where a determination is made whether the MPA is connected to agent. If there is no connection to an agent, then the "No" branch is followed to step 1112 where a C++thread is created. At step 1114 a connection is opened to the agent. Following step 1114 or the "Yes" branch of step 111, the supported classes are retrieved from the Agent Object at step 1116. Each of the N objects is retrieved by class at step 1120 in the loop at 1118. Following completion of the loop, the set or delete operation is applied to each object at step 1122 and a response is sent at step 1124.

Figure 12:
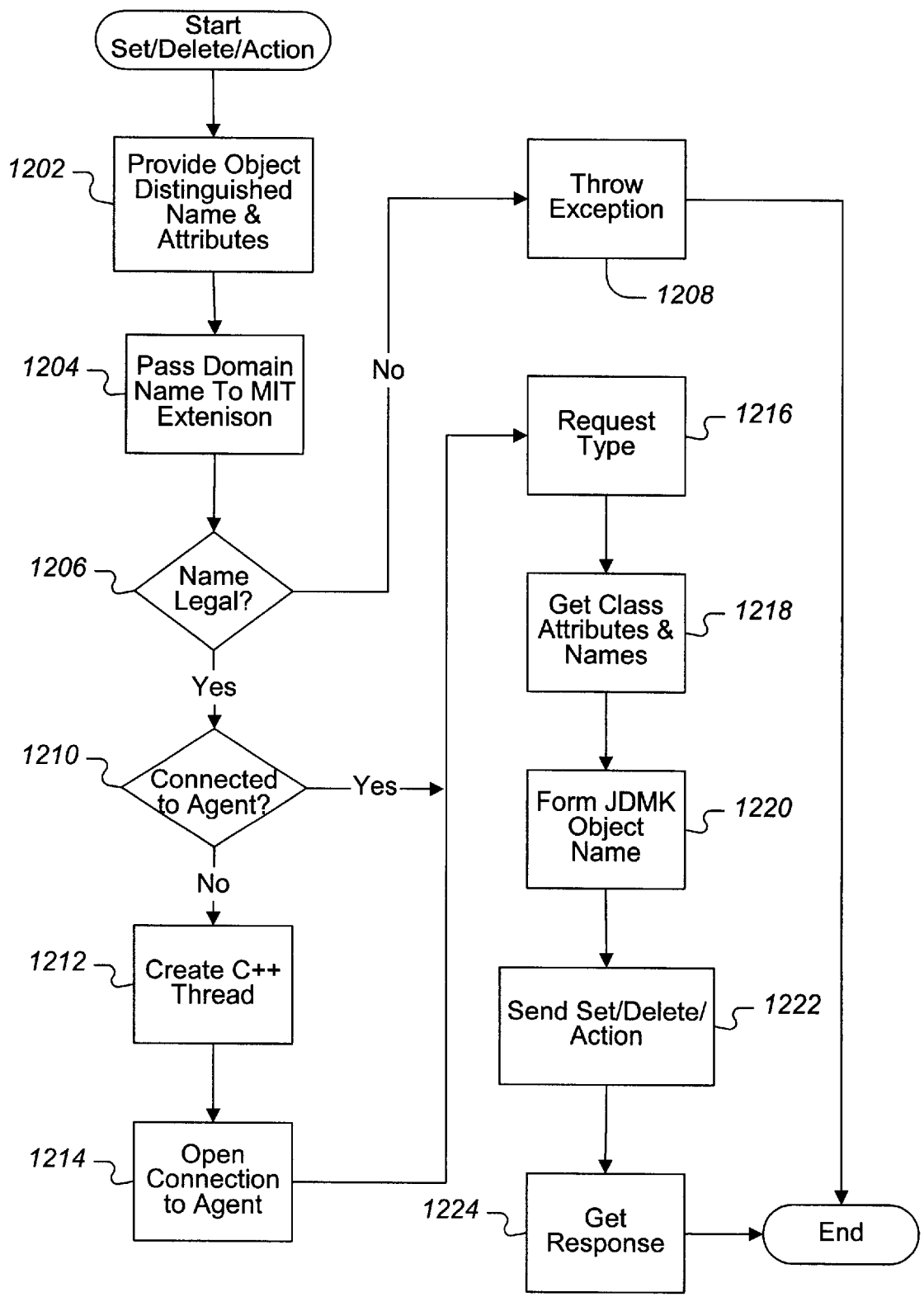
FIG. 12 is a flowchart illustrating one embodiment for processing a "set delete/action" request in accordance with the present invention.

FIG. 12 illustrates a method for set, delete, or other actions on a JDMK Object in accordance with one embodiment of the present invention. Starting at 1202 the JDMK MPA is provided with a Distinguished Name for the object and the attributes of the object. The attributes are derived from the translated GDMO Document created at step 302 of FIG. 3. At step 1204, the Distinguished name is passed to the MIT Extension of the MPA and, at step 1206, a determination is made whether the Distinguished Name is legal. If the name is not legal, then the "No" branch of step 1206 is follows in which an exception is thrown at step 1208 and the process terminates. Otherwise, the "Yes" branch of step 1206 is followed to step 1210 where a determination is made whether the MPA is connected to agent. If there is no connection to an agent, then the "No" branch is followed to step 1212 where a C++thread is created. At step 1214 a connection is opened to the agent. Following step 1214 or the "Yes" branch of step 1210, the Request Type for the creation is derived from the Distinguished Name at step 1216. At step 1218, the class names and attributes for the object are determined, the latter being obtained from the MIT. At step 1220, the JDMK object name is created. At step 1222, the set, delete, or action is sent to the object in which a Java invocation of the set, delete, or action method is mapped onto the agent. At step 1224 a CMIS notification obtained by the MPA from the agent.

The sequence of operations illustrated in FIG. 11 allows a Java-based application (such as UI 102) running with a Java-based ("natural") object on a Platform in accordance with the present invention to pass the object to a JDMK agent. The Java-based object can then be invoked or run by the JDMK agent. Those of skill in the computer science arts will appreciate the JDMK agent functions as a Java virtual machine and can execute Java programs. Thus, the JDMK MPA/agent combination provided by the present invention provides functionality not available using GDMO alone. Also, new Java classes can be can be added to the MPA using the methods and architectures described above without restarting the MPA. This feature allows improvements to be added to the Platform without excessive delays.

Figure 13:
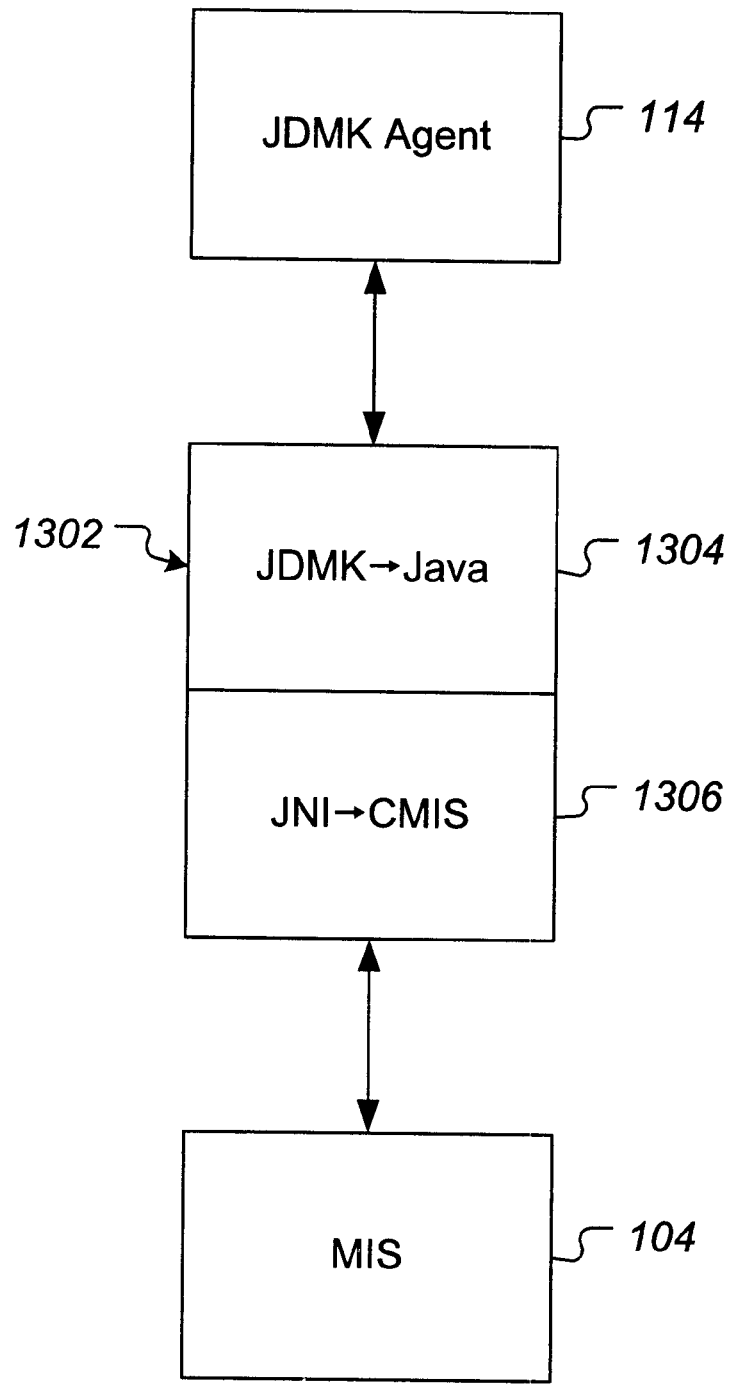
FIG. 13 is an illustration of one embodiment of a process daemon in accordance with the present invention.

In another aspect, the present invention provides a daemon process to update dynamically any changes made to the MPA/Agent architecture using the methods illustrated above. FIG. 13 illustrates one embodiment of such a daemon at 1302. The daemon includes two mechanisms. A first mechanism 1304 translates JDMK messages received from JDMK Agent 114 to Java/JNI. This first mechanism performs an inverse translation to that performed by mechanism 610 of MPA 604 illustrated in FIG. 6. A second mechanism translates the Java/JNI messages created by first mechanism 1304 into CMIS by performing an inverse translation to that performed by mechanism 608 of MPA 604 illustrated in FIG. 6.

Figure 14:
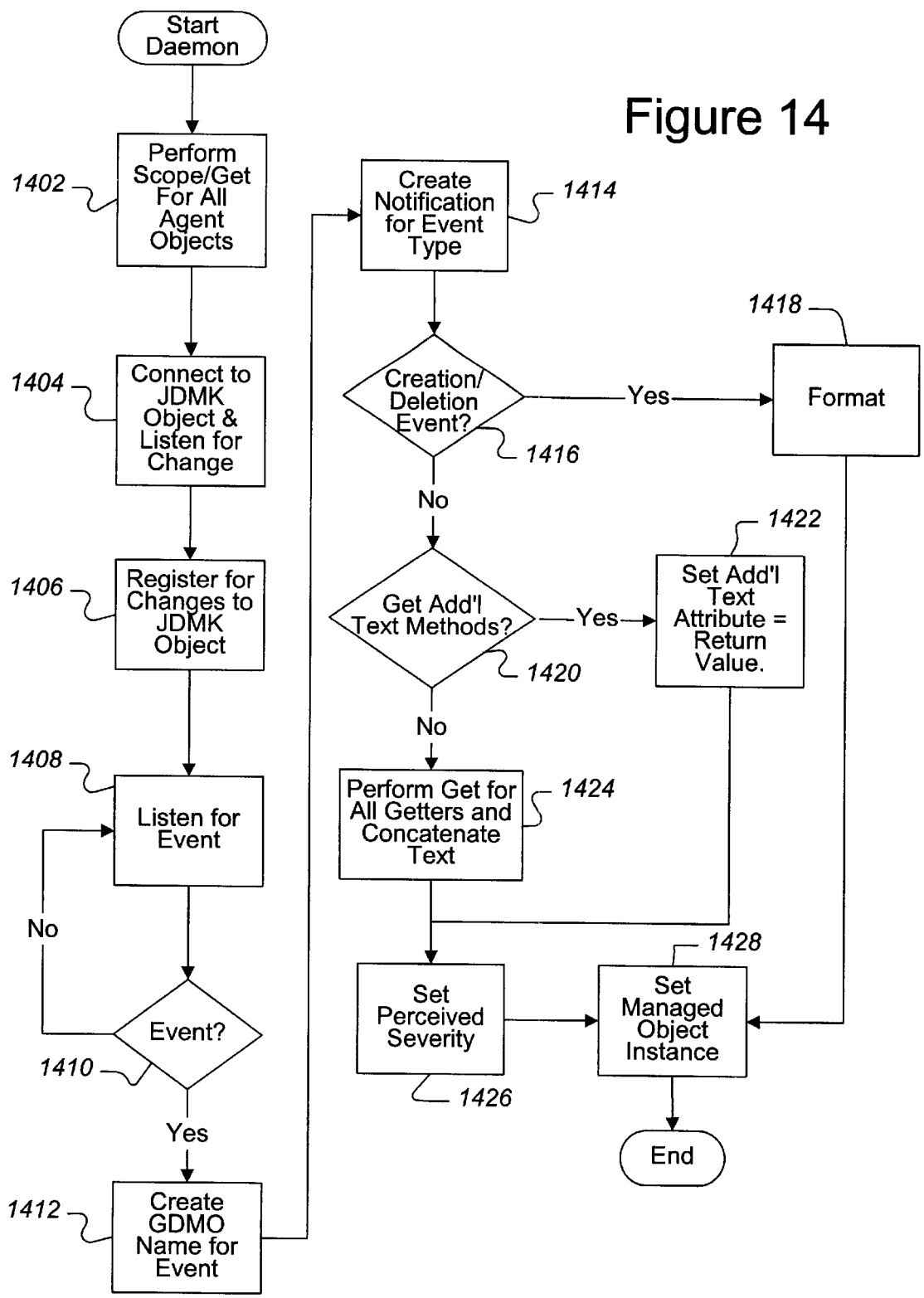
FIG. 14 is a flowchart illustrating the operation of a daemon process according to one embodiment of the present invention.

One embodiment of a method for the operation of the daemon provided by the present invention is illustrated in FIG. 14. Starting at 1402, the daemon performs a scope/get for JDMK agent objects using the MIS as described above. At step 1404, the daemon connects to a JDMK agent object. At step 1406, the daemon registers to receive notice of any changes made to the object using, e.g., the methods described above, and, at steps 1408 listens for any such notification. If a notification is received, then, following the "Yes" branch of step 1410, a GDMO name for the event is created at step 1412. A notification for the event type is created at step 1414. At step 1416, a determination is made whether the event is a JDMK object creation/deletion event. If the event is not a JDMK object creation/deletion event, then, following the "Yes" branch of step 1416, the event is forwarded at step 1418 and the manage object instance is set at 1428 as described below.

If the event is a not JDMK object creation/deletion event, then, following the "No" branch of step 1416, a determination is made whether additional text methods need to be retrieved at step 1420. If such additional text methods need to be retrieved, then following the "Yes" branch of step 1420 to step 1422, an "Additional Text Attribute" flag is set to the return value and the process moves to step 1426 as described below. Otherwise, the "No" branch of step 1420 is followed to step 1424 where the text methods are concatenated and, at step 1426, the perceived severity for the event is set. If a get perceived severity statement is included, then the perceived is the return value for that getter. Otherwise a default value is used. The managed object instance is then set at step 1428. In one embodiment, the managed object instance is set automatically if the event is a JDMK create/delete event. If the event is other than a JDMK create/delete event, then. if a get managed object instance statement is included, the managed object instance is the return value for that getter. Otherwise a default value is used.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general-purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; holographic storage arrays, and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 15:
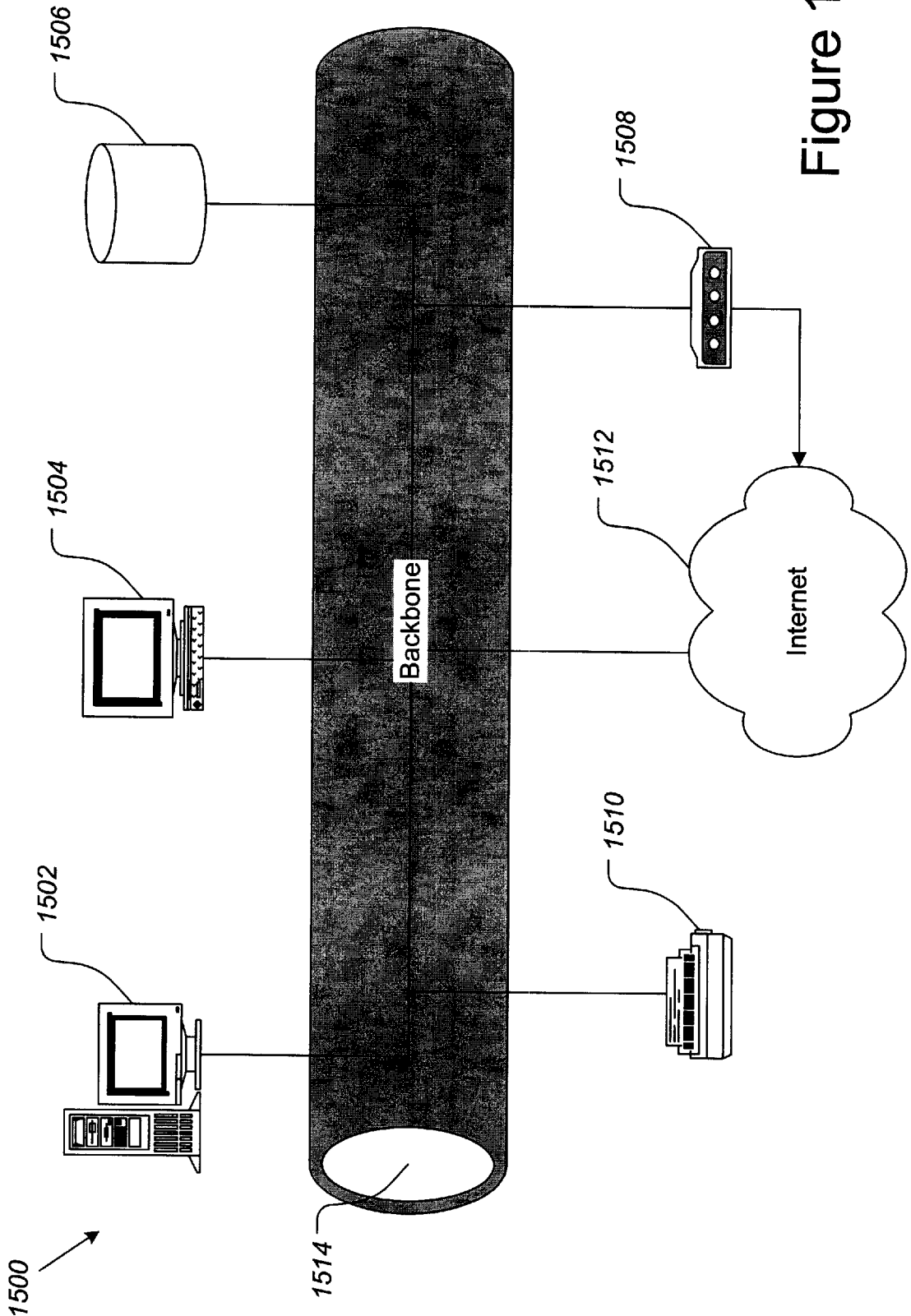
FIG. 15 is an illustration of a computer network.

The present invention further relates to computer networks such as illustrated at 1500 in FIG. 15. There, a server 1502 (which can be a plurality of servers depending on the network configuration) provides network data and management resources for operating network 1500. In one embodiment, the network management software provided by the present invention, in particular, the above-described Name Service is installed and operated from server 1502. Various devices and entities reside on and communicate over the network. These devices and entities include, but are not limited to, client computers 1504, data storage devices 1506, modems and other communications devices 1508, printers other hardcopy input/output devices 1510, and connections to the Internet (which is shown generally at 1512). All of these devices communicate with each other over network backbone 1514. Still other common network devices not shown include hub, routers, packet switchers, switches, hosts, bridges and the like. As noted above, each of these devices can include one or more drivers, agents, and/or proxies that are managed by network management computers such as illustrated at 1502.

Figure 16:
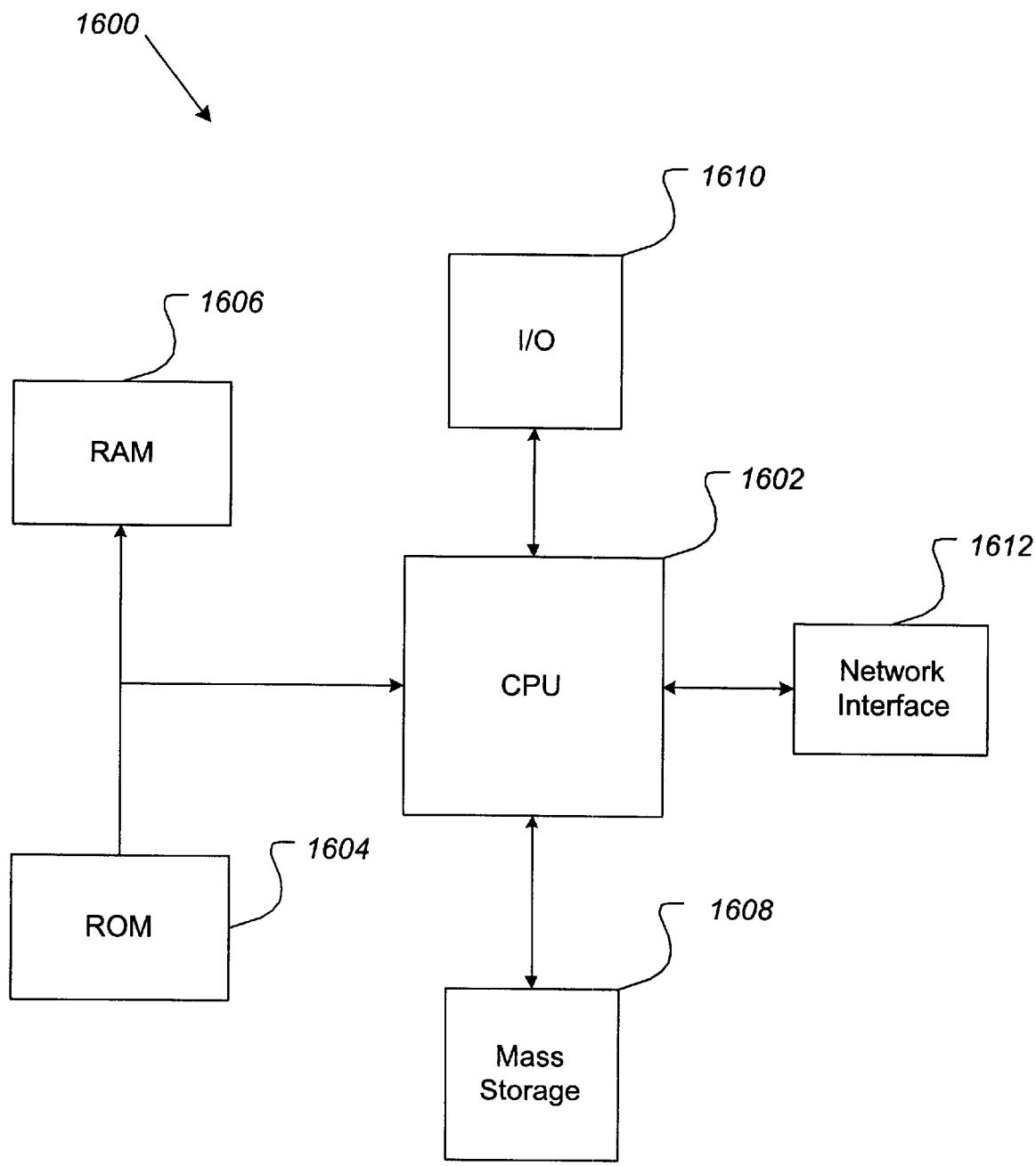
FIG. 16 is an illustration of a computer system.

FIG. 16 at 1600 shows a typical computer-based system in accordance with the present invention. Shown is a central processing unit 1602 (CPU) which is coupled to memory devices including read only memory 1604 (ROM) and random access memory 1606 (RAM). As is well known in the art, ROM 1604 acts to transfer data and instructions unidirectionally to the CPU and RAM 1606 is used typically to transfer data and instructions in a bidirectional manner. A mass memory device 1608 is also coupled bidirectionally to CPU 1602 and provides additional data storage capacity. The mass memory device 1608 may be used to store programs, data and the like and may take the form of a magnetic or paper tape reader or some other well known device (e.g., CD-ROM). It will be appreciated that the information retained within the mass memory device 1608, may, in appropriate cases, be incorporated in standard fashion as part of RAM 1606 in the form of virtual memory. CPU 1602 is also coupled to one or more input/output devices 1610 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 1602 optionally can be coupled to a computer or telecommunications network 1614 using a network connection as shown generally at 1612. The above-described devices and materials will be familiar to those of skill in the computer hardware and software arts (see, e.g., Ralston, Anthony, and Reilly, Edwin D. 1993 . *Encyclopedia of Computer Science.* Van Norstrand Reinhold; Herzog, James H. 1996 . *Design and Organization of Computing Structures.* Franklin, Beedle & Associates, Inc.; Stone, Harold S. 1983 . *Microcomputer Interfacing.* Addison Wesley; Martin, James, and Chapman, Kathleen K. 1989. Local Area *Networks. Architectures and Implementations.* Prentice Hall.)

5 CONCLUSION

Thus, the present invention will be seen to provide an efficient, scalable, and modular software, systems, and methods for providing JDMK support to manage devices and other entities on a computer and communications networks. Using the software, systems, and methods described herein name services large, complex networks can be implemented efficiently. More particularly, the present invention provides mechanisms and software to implement versatile and powerful Javabased processes by network agents and objects. Thus, the software, methods, and systems provided by the present invention greatly facilitate the development of tools to manage computer networks and thereby facilitate management of such networks.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various naming conventions can be used in conjunction with the naming service without significant change to the systems, software, or methods described herein.

What is claimed:

1. A system for implementing Java-based software network management objects configured to implement computer network management functions on a computer network, comprising:

(a) a computer network management information server configured to send and receive computer network management communications using a first computer network management communications protocol, said management information server being coupled with (b) a Java development management kit methods protocol adapter configured to translate said first computer network management communications protocol into a Java development management kit communications protocol, said Java development management kit methods protocol adapter being coupled with (c) a Java development management kit ("JDMK") agent configured to communicate with said Java development management kit methods protocol adapter using said Java development management kit communications protocol.

2. The method of claim 1, further including the step of communicating with said JDMK agent object over said computer network.

3. The method of claim 1, wherein said steps of creating a JDMK agent object and providing address, type, object class information for said JDMK agent object include the sub-steps of:

a. providing a distinguished name for said JDMK agent object;

b. providing attributes for said JDMK agent object;

c. forming a connection with said JDMK agent object; and d. forming a JDMK agent object name for said JDMK agent object.

4. The method of claim 1, further including the step of managing said JDMK agent using said JDMK agent object.

5. The method of claim 4, wherein said step of managing said JDMK agent includes the steps of performing a scope get or filter get operation on said JDMK agent object, wherein said scope get or filter get operation includes the steps of:

a. providing a distinguished name for said JDMK agent object;

b. providing attributes for said JDMK agent object;

c. forming a connection with said JDMK agent;

d. determining supported classes from said JDMK agent object;

e. retrieving said JDMK agent object according to the classes determined in step d; and f. translating said JDMK agent object into a computer network communication protocol or language.

6. The method of claim 5, further including the step of determining the name of said JDMK agent object.

7. The method of claim 5, further including the step of applying a filter to said JDMK agent object.

8. The method of claim 5, further including the step of applying a setter operation to said JDMK agent object.

9. The method of claim 5, further including the step of applying a delete operation to said JDMK agent object.

10. The method of claim 5, further including the step of applying an action operation to said JDMK agent object.

11. The method of claim 1, further including the step of listening for a change made to said JDMK agent and providing a notification of said change.

12. The method of claim 11, wherein said listening is performed by a daemon configured to monitor the status of said JDMK agent object, receive notifications of changes made to said JDMK agent object, and forward such notifications to other entities on said computer network.

13. The method of claim 11, wherein further including the steps of:

a. creating a GDMO name for an event signaling that said JDMK agent has been changed;
   b. creating a notification corresponding to said event;
   c. determining whether said event is an agent object creation/deletion event;
   d. forwarding said notification if said event is an agent object creation/deletion event; and
   e. setting a perceived severity of said event if said event is not an agent object creation/deletion event.

14. The computer-readable medium of claim 13, wherein said computer network communications protocol is GDMO.

15. A daemon configured to monitor for, and report the occurrence of, events in a JDMK agent object, said daemon comprising:

a. a first translation mechanism configured to translate messages from said JDMK agent object from JDMK-encoding into Java encoding; coupled with
   b. a second translation mechanism configured to translate messages encoded in Java into a computer network communication protocol.

16. The daemon of claim 15, wherein said computer network communication protocol is CMIS.

17. The daemon of claim 15, wherein said first translation mechanism is coupled with a JDMK agent object.

18. The daemon of claim 15, wherein said second translation mechanism is coupled with a management information server.

19. A computer-readable medium comprising computer-readable program code devices, said computer-readable program code devices being configured to cause a computer to implement the computer-controlled steps of:

a. creating a JDMK agent object configured to provide computer network management functions;
   b. providing an address, type, and object class information for said JDMK agent; and
   c. installing said JDMK agent object on said computer network.

20. A computer data signal on a carrier wave containing instructions configured to cause a computer to perform the steps of claim 19.

* * * * *